US009309073B2

(12) United States Patent
Koyama

(10) Patent No.: US 9,309,073 B2
(45) Date of Patent: Apr. 12, 2016

(54) DRIVE DEVICE AND IMAGE FORMING APPARATUS

(71) Applicant: KONICA MINOLTA INC., Chiyoda-ku, Tokyo (JP)

(72) Inventor: Kiyomitsu Koyama, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/700,929

(22) Filed: Apr. 30, 2015

(65) Prior Publication Data

US 2015/0321866 A1  Nov. 12, 2015

(30) Foreign Application Priority Data

May 9, 2014  (JP) .................................. 2014-097476

(51) Int. Cl.
*B65H 3/02* (2006.01)
*B65H 5/06* (2006.01)
*F16D 23/12* (2006.01)
*B65H 3/06* (2006.01)
*B65H 7/20* (2006.01)

(52) U.S. Cl.
CPC .............. *B65H 5/068* (2013.01); *B65H 3/0669* (2013.01); *B65H 3/0684* (2013.01); *B65H 7/20* (2013.01); *F16D 23/12* (2013.01)

(58) Field of Classification Search
CPC ...... B65H 3/02; B65H 3/0669; B65H 3/0684; B65H 5/068; B65H 7/20; B65H 2403/70; B65H 2403/723; F16D 11/06; F16D 11/16; F16D 19/00; F16D 23/12; F16D 2023/123; F16D 2023/126; F16D 23/142; F16D 41/06; F16D 2041/0605

See application file for complete search history.

(56) References Cited

U.S. PATENT DOCUMENTS

| 2005/0189191 | A1* | 9/2005 | Tomita | B65H 3/0669 192/26 |
| 2007/0273081 | A1* | 11/2007 | Sonoda | B65H 3/0669 271/114 |
| 2008/0185776 | A1* | 8/2008 | Okuno | B65H 3/0607 271/275 |
| 2011/0164911 | A1* | 7/2011 | Li | B65H 3/0669 400/582 |

FOREIGN PATENT DOCUMENTS

| JP | 2001-304296 A | 10/2001 |
| JP | 2003-255639 A | 9/2003 |
| JP | 2005-335859 A | 12/2005 |

* cited by examiner

*Primary Examiner* — David H Bollinger
(74) *Attorney, Agent, or Firm* — Buchanan Ingersoll & Rooney PC

(57) ABSTRACT

A drive device includes: a cam; a clutch installed on a same shaft with the cam, and for connecting/disconnecting rotational force from a power source to the cam through the shaft according to rotation of a clutch collar; an actuator including a claw part; and a control mechanism for controlling a position of the claw part of the actuator, wherein a projection part includes a first projection part and a second projection part provided at asymmetric positions on a periphery of the clutch collar, and an angle A and an angle B satisfy the angle A<the angle B, where a central angle from the first projection part to the second projection part in the rotating direction is the angle A, and a central angle from the second projection part to the first projection part in the rotating direction is the angle B.

6 Claims, 19 Drawing Sheets

DRIVE DEVICE AND IMAGE FORMING APPARATUS

The entire disclosure of Japanese Patent Application No. 2014-097476 filed on May 9, 2014 including description, claims, drawings, and abstract are incorporated herein by reference in its entirety.

BACKGROUND OF THE INVENTION

1. Field of the Invention

The present invention relates to a drive device and an image forming apparatus, and especially relates to a drive device including a clutch, and an image forming apparatus in which the drive device is mounted.

2. Description of the Related Art

There is a drive device including a clutch that connects/disconnects rotation of a motor as a drive source to a driven member. For example, the drive device is mounted in an image forming apparatus such as a multi-functional peripheral (MFP). In the image forming apparatus, the drive device for driving a conveyance roller is used when print sheets are conveyed from a cassette or a sheet feeding tray to a development position one by one.

That is, a pushing-up plate for raising the stored sheets to a position where an upper surface of a bundle of sheets abuts on a sheet feeding roller installed at an upper side is installed in the cassette or the sheet feeding tray. The pushing-up plate is positioned on a bottom surface of the cassette or the sheet feeding tray so that the sheets can be supplied at a normal time other than the time of feeding the sheets. At the time of feeding the sheets, the drive device pushes up the pushing-up plate to raise the sheets stored therein, and allows the upper surface of the sheets comes in contact with the sheet feeding roller. When conveyance is terminated, the drive device lowers the pushing-up plate to put it to the original position.

To perform the operation, it is necessary to grasp the position of the pushing-up plate at the time of starting the operation. That is, the drive device needs to set the driven member to an initial position (home position) of the operation after accurately grasping the position of the driven member at the time of starting driving. In the case where the driven member is the pushing-up plate, it is necessary to position the pushing-up plate on the bottom surface of the cassette or the sheet feeding tray at the time of starting the sheet feeding operation.

The position of the driven member such as the pushing-up plate can be detected using a sensor or the like. For example, JP 2005-335859A disclose technologies that detect the position of a pushing-up plate by detecting the position of a member that transmits drive force to the pushing-up plate using a sensor.

However, meanwhile, there are needs for simplification and a decrease in cost of devices, and there is a problem that providing of a detecting mechanism such as a sensor does not accord with the needs.

SUMMARY OF THE INVENTION

The present invention has been made in view of the foregoing, and an object is to provide a drive device, and an image forming apparatus in which the drive device is mounted, which can set a position of a driven member to a position of at the time of starting driving, with a simpler structure.

To achieve the abovementioned object, according to an aspect, a drive device reflecting one aspect of the present invention comprises: a cam; a clutch installed on a same shaft with the cam, and for connecting/disconnecting rotational force from a power source to the cam through the shaft according to rotation of a clutch collar; an actuator including a claw part; and a control mechanism for controlling a position of the claw part of the actuator, wherein the control mechanism controls the position of the claw part such that a distance L becomes a first distance with which the claw part is able to abut on a projection part provided on the clutch collar, or a second distance with which the claw part is able to be separated from the projection part of the clutch collar, where a distance from the claw part to a surface of the clutch collar of the clutch is the distance L, the clutch transmits the rotational force to the cam by rotation of the clutch collar according to the rotational force in a state where the claw part is separated from the projection part, and cuts off the transmission to the cam by stopping of the rotation by the clutch collar in a state where the claw part abuts on the projection part, the projection part includes a first projection part and a second projection part provided at asymmetric positions on a periphery of the clutch collar, the periphery being of a rotating direction of the rotating force, an angle A and an angle B satisfy the angle A<the angle B, where a position where the claw part abuts on the first projection part is an initial position in a drive operation of the cam, a central angle from the first projection part to the second projection part in the rotating direction of the rotational force is the angle A, and a central angle from the second projection part to the first projection part in the rotating direction of the rotational force is the angle B, and the control mechanism executes initial control in which the position of the claw part is caused to be a position where the distance L becomes the second distance during a time T1 in which the clutch collar is rotated by an angle larger than the angle A and smaller than the angle B by the rotational force, and the position of the claw part is caused to be a position where the distance L becomes the first distance after passage of the time T1, at a time of starting the drive operation, in order to cause the cam to come to the initial position.

According to another aspect of the present invention, the drive device is preferably mounted in an image forming apparatus. The cam preferably has a plurality of values of a distance from the shaft to an outer edge, and the image forming apparatus preferably includes a sheet feeding mechanism for changing a position of a mounting member for mounting sheets thereon according to a distance to the outer edge of the cam, and conveying the sheets mounted on the mounting member to an image forming position every time of the change.

Preferably, the mounting member is energized in a direction toward a conveying member for conveying the sheets by elastic force. The cam is preferably arranged at the same side as the conveying member with respect to the mounting member, and at a position where a distance from the mounting member to the shaft becomes a distance smaller than a maximum value of the distance from the shaft to the outer edge. When the cam is rotated by the rotational force, the outer edge preferably abuts on the mounting member and presses the conveying member in a direction opposite to the direction of the energization by the elastic force, and away from the conveying member.

More preferably, in a part of the outer edge of the cam, the part being corresponding to a periphery of the clutch collar that reaches a position where the second projection part abuts on the claw part from a position where the first projection part abuts on the claw part according to the rotational force, the distance from the shaft to the outer edge is longer than a distance from the shaft to the conveying member, and in a part of the outer edge of the cam, the part being corresponding to the periphery of the clutch collar that reaches a position where the first projection part abuts on the claw part from a position where the second projection part abuts on the claw part according to the rotational force, the distance from the shaft to the outer edge is the distance from the shaft to the conveying member or less.

More preferably, the control mechanism of the drive device executes a drive operation in which the position of the claw part is caused to be a position where the distance L becomes the second distance during a time T2 in which the clutch collar is rotated by an angle smaller than the angle A by the rotational force, and the position of the claw part is caused to be a position where the distance L becomes the first distance after passage of the time T2, at timing when the conveyance of the sheets is started.

More preferably, the control mechanism of the drive device performs a drive operation in which the position of the claw part is caused to be a position where the distance L becomes the second distance during the time T1 in which the clutch collar is rotated by an angle larger than the angle A and smaller than the angle B by the rotational force, and the position of the claw part is caused to be a position where the distance L becomes the first distance after passage of the time T1, at timing when the conveyance of the sheets is terminated.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples. In the description below, the same part s and configuration elements are denoted with the same reference signs. Names and functions thereof are also the same. Therefore, repetitive description is not given.

<Apparatus Configuration>

Figure 1:
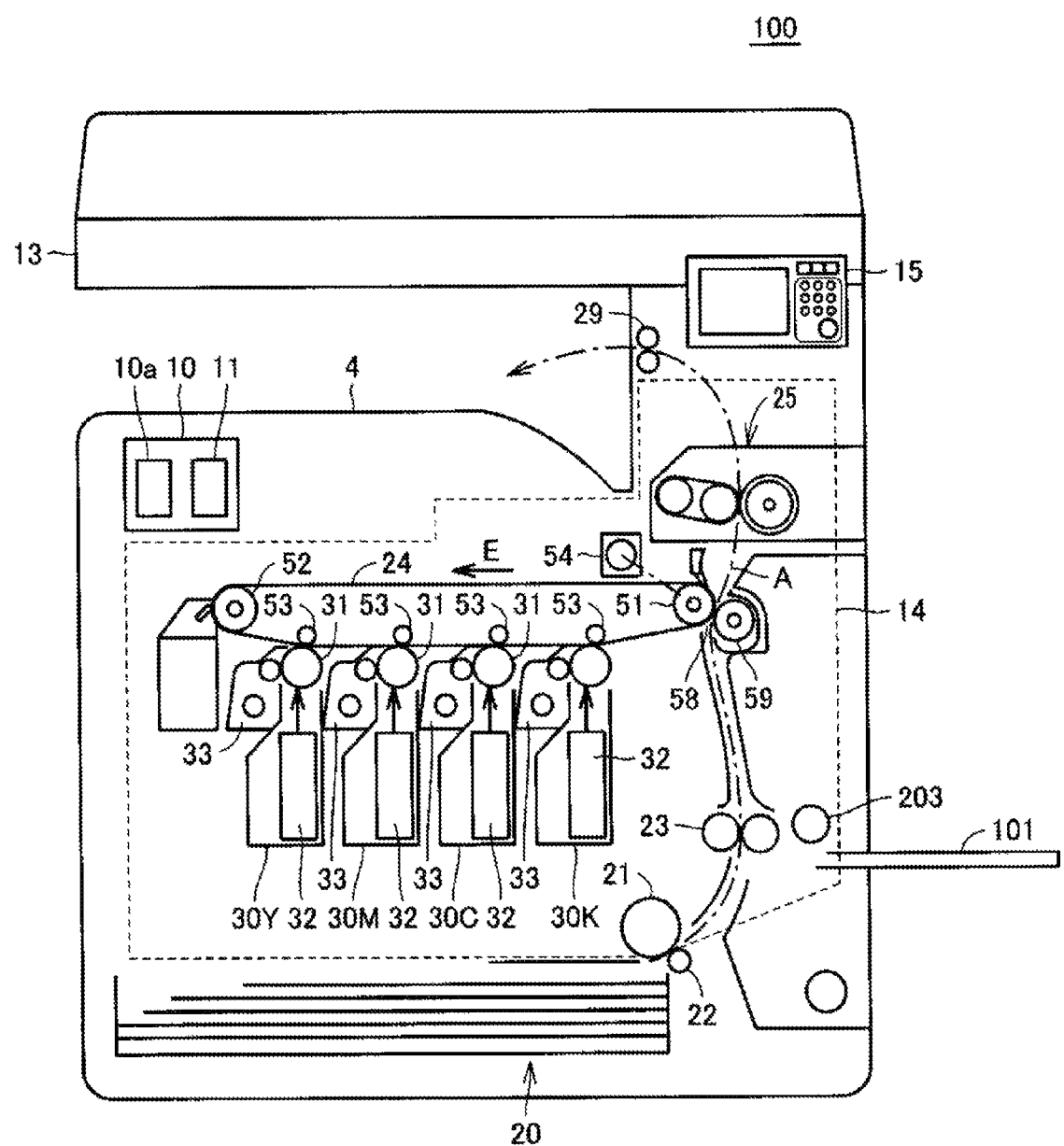
FIG. 1 is a schematic diagram illustrating a specific example of an apparatus configuration of a multi-functional peripheral (MFP) according to an embodiment.

FIG. 1 is a schematic diagram illustrating a specific example of an apparatus configuration of a multi-functional peripheral (MFP) 100 according to the present embodiment, as an example of an image forming apparatus. As an example, the MFP 100 forms a color image in a tandem-type electronic photograph system.

Referring to FIG. 1, the MFP 100 includes a printer 14, a scanner 13, an operation panel 15, and a control unit 10 that includes a central processing unit (CPU) 10a for controlling the entire apparatus, and a memory 11.

The scanner 13 may be a known scanner. As an example, the scanner 13 optically reads an image of a manuscript placed on a manuscript table (not illustrated), and decomposes the image into RGB three primary colors and converts the three primary colors into electrical signals. The electrical signals are transferred to the control unit 10 and various types of data processing are applied. Further, the electrical signals are converted into respective YMCK (yellow, magenta, cyan, and black) reproduced colors.

The printer 14 includes units 30Y, 30M, 30C, and 30K (which are represented by and referred to as units 30) of the respective colors. Each unit 30 includes a photosensitive drum 31, a laser scanning optical unit 32, a developing unit 33, and a charger (not illustrated). The units 30 are arranged in parallel, facing an intermediate transfer belt 24.

In each unit 30, known image forming processing is performed. As an example, the laser scanning optical unit 32 receives transfer of image data from the control unit 10, and forms a latent image on the photosensitive drum 31. The developing unit 33 forms a toner image of each color.

The intermediate transfer belt 24 is an endless belt suspended by a drive roller 51 and a driven roller 52. The drive roller 51 is rotated and driven by a motor 44, so that the intermediate transfer belt 24 is rotated in the arrow E direction.

A sheet feeding cassette 20 in which a plurality of sheets can be layered and housed is installed in a lower stage of the printer 14. Further, a tray 101, a so-called manual feed tray, on which a plurality of sheets can be placed, is set to a side part of the printer 14, the plurality of sheets being inserted from an outside of the apparatus.

The sheets housed in the sheet feeding cassette 20, and the sheets set to the tray 101 are conveyed in a conveyance path A upward. That is, the sheets housed in the sheet feeding cassette 20 are introduced one by one in the conveyance path A by a sheet feeding roller 21 and a separating roller 22, and are conveyed to a secondary transfer nip part 58 by a timing roller 23. Further, the sheets set to the tray 101 are introduced one by one in the conveyance path A by a sheet feeding roller 203, and are conveyed to the secondary transfer nip part 58 by the timing roller 23. The sheets are conveyed upward.

A toner image formed on the photosensitive drum 31 is sequentially transferred and composited on the intermediate transfer belt 24 for each color, by an electric field given by a primary transfer roller 53. This transfer is called primary transfer. A composited image is transferred on a sheet conveyed on the conveyance path A, by an electric field given by a secondary transfer roller 59 in the secondary transfer nip part 58. This transfer is called secondary transfer. The sheet subjected to the secondary transfer is conveyed to a fixing unit 25 and heated. Accordingly, the toner image is fixed on the sheet. The sheet after the fixation is discharged from a discharge roller 29 to a sheet discharging part 4 that is an upper surface of the printer 14.

Figure 2A:
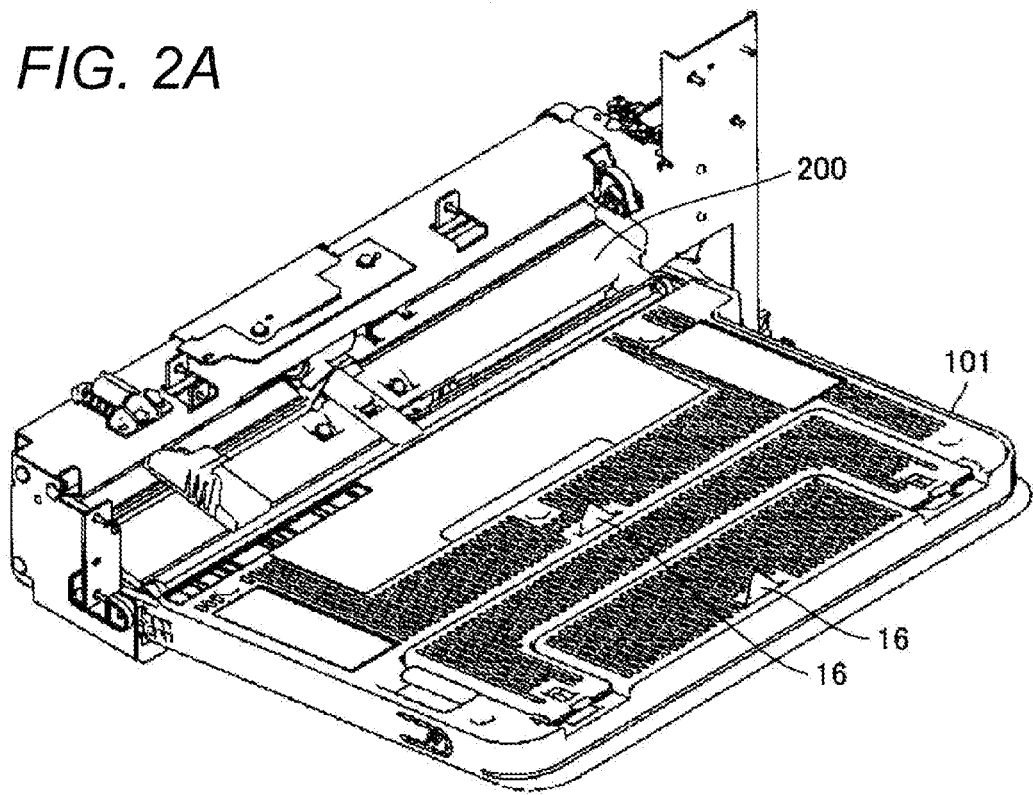
FIGS. 2A and 2B are perspective views illustrating appearances of a tray installed in the MFP.
Figure 2B:
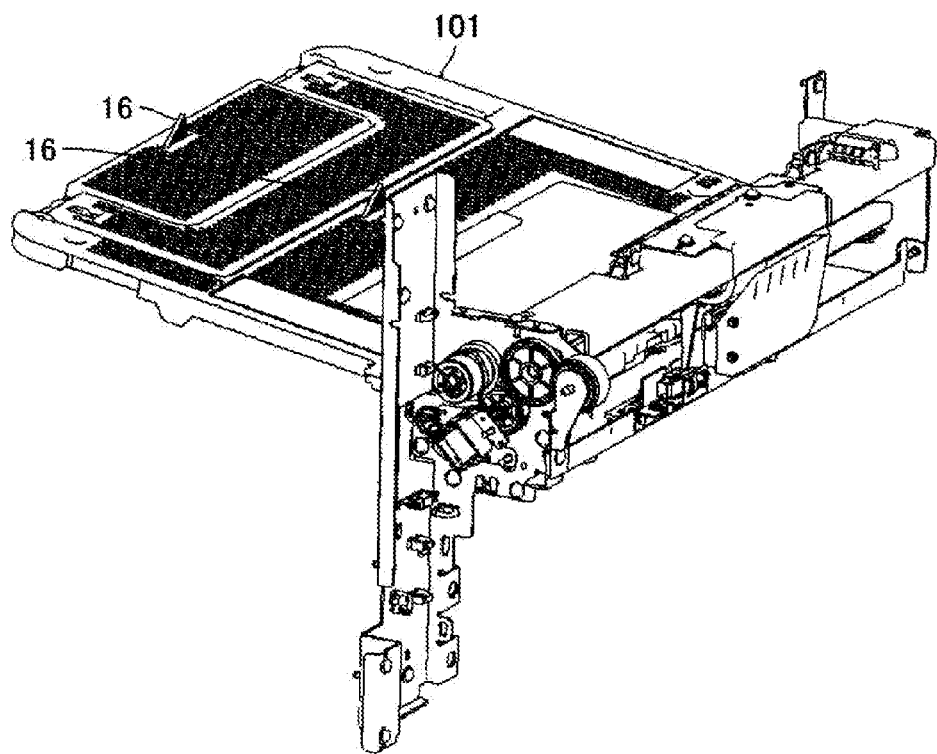

FIGS. 2A and 2B are perspective views illustrating appearances of the tray 101. FIG. 2A is an appearance of the tray 101 as viewed from an outside of the apparatus, and FIG. 2B illustrates an appearance of the tray 101 as viewed from an inside of the apparatus. Referring to FIG. 2A, an introduction port for introducing the sheets from an outside of the apparatus is provided in a side surface of the printer 14, and the tray 101 is arranged to be able to introduce the sheets to the introduction port.

A sensor 16 for detecting existence or non-existence of a sheet is provided at an upper surface side of the tray 101, the sheet being placeable on the upper surface. As an example, a physical switch that is pressed when the sheet is placed corresponds to the sensor 16. The sensor 16 outputs a detection signal to the control unit 10.

A pushing-up plate 200 is arranged at the introduction port of the printer 14, and is driven up and down by a drive device described below. Referring to FIG. 2B, as an example, the drive device is provided at one end or both end parts of a direction perpendicular to a conveying direction of the sheets, of the pushing-up plate 200. Details of the drive device will be described below.

<Description of Problem>

(Description of Drive Device of Conventional MFP)

Figure 3:
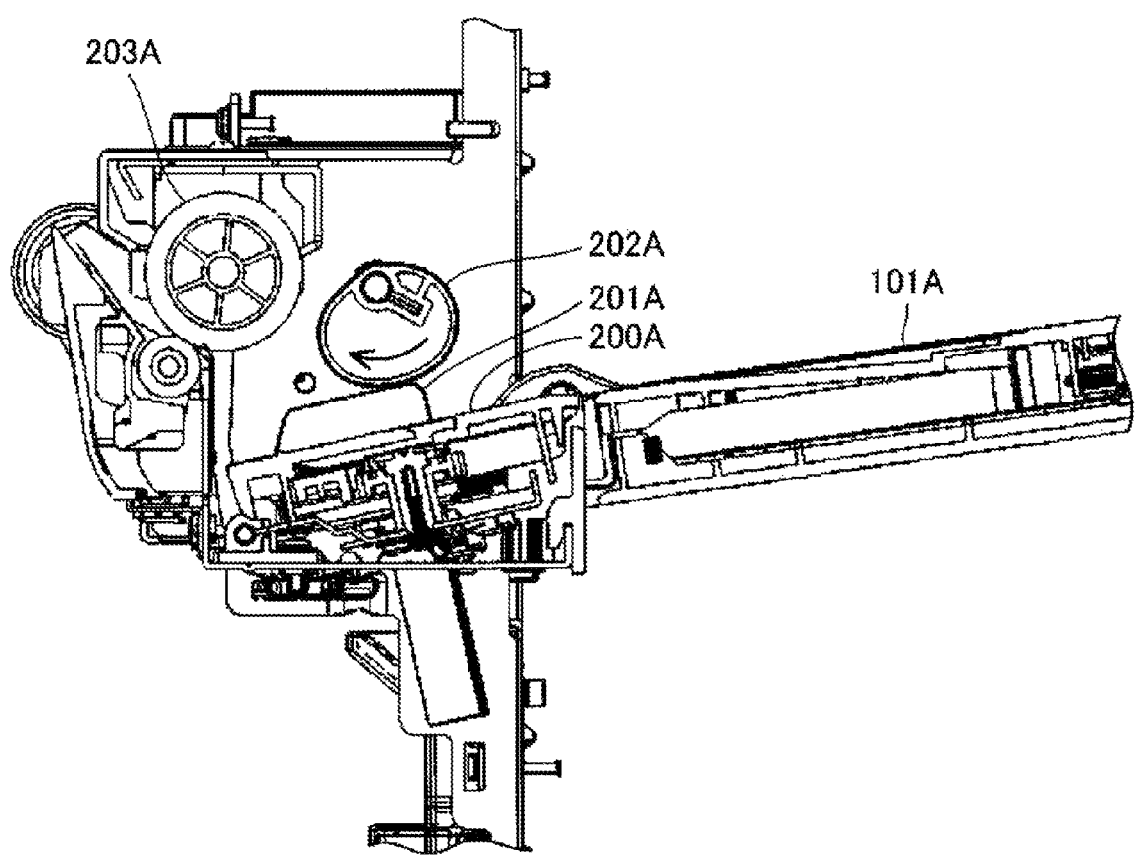
FIG. 3 is a diagram for describing a drive device in a conventional MFP.
Figure 4:
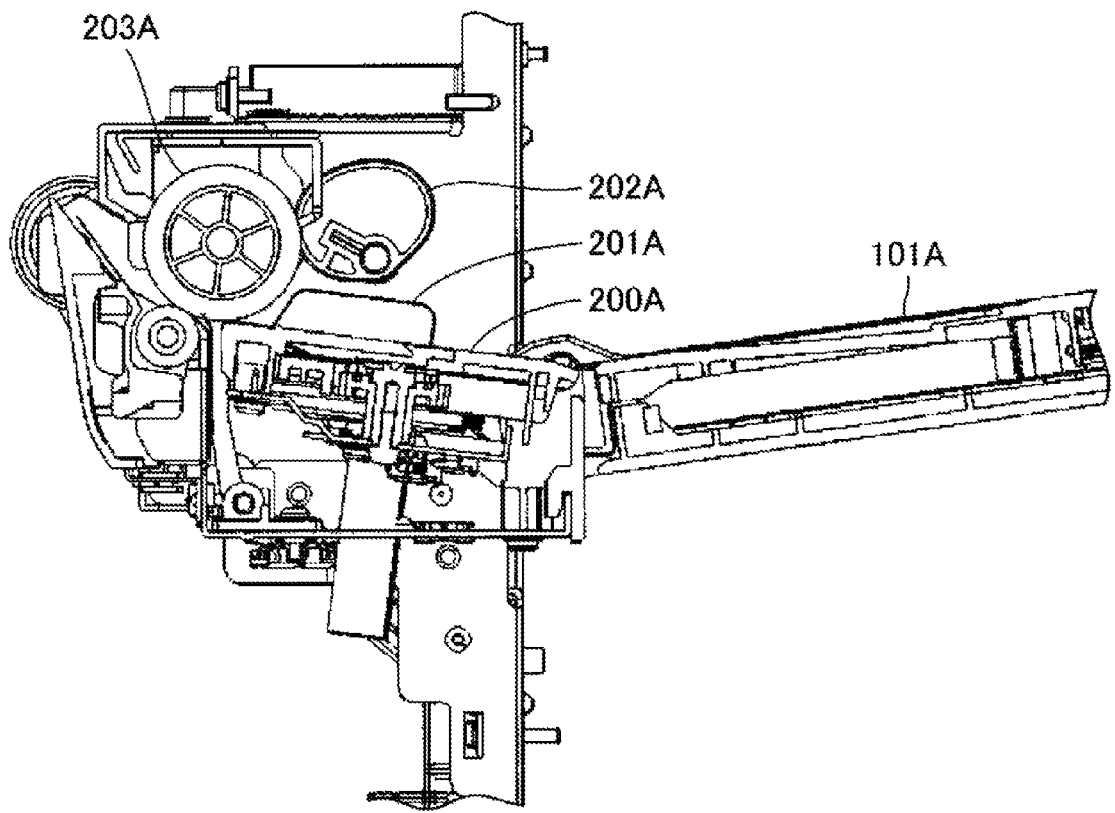
FIG. 4 is a diagram for describing the drive device in the conventional MFP.
Figure 5:
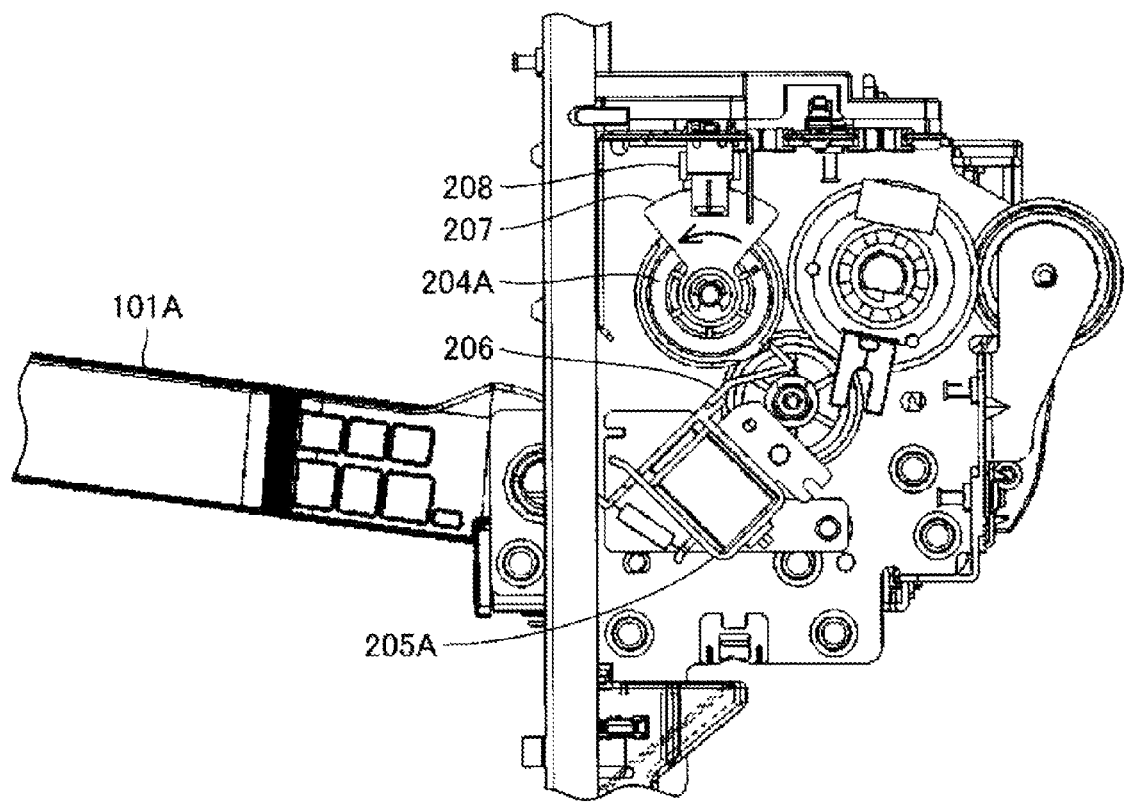
FIG. 5 is a diagram for describing the drive device in the conventional MFP.
Figure 6:
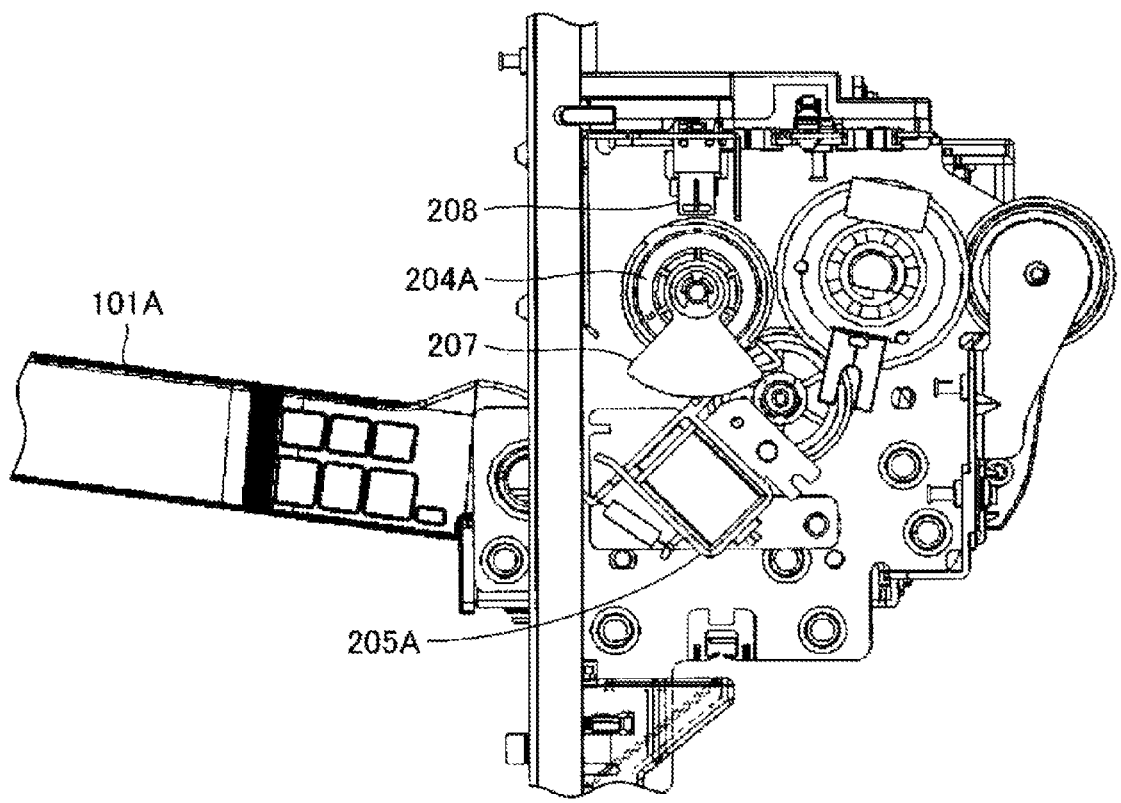
FIG. 6 is a diagram for describing the drive device in the conventional MFP.

FIGS. 3 to 6 are diagrams for describing a drive device in a conventional MFP. FIGS. 3 and 4 illustrate diagrams where a cross section in a surface containing a conveying direction of sheets placed on a tray 101A is viewed from an inside to an outside of a drive device of a pushing-up plate 200A of a conventional MFP. In FIGS. 3 and 4, the sheets placed on the tray 101A are conveyed from the right to the left. This surface is also referred to as a first surface side. FIGS. 5 and 6 illustrate cross sections where the drive device illustrated in FIGS. 3 and 4 is viewed from a second surface at an opposite side to the first surface, that is, from the outside to the inside of the device. In FIGS. 5 and 6, the sheets placed on the tray 101A are conveyed from the left to the right.

Referring to FIG. 3, a projecting part 201A is provided on the pushing-up plate 200A, and a cam 202A is arranged at a position being in contact with the projecting part 201A. The pushing-up plate 200A is energized upward at a side where the cam 202A is arranged, by elastic force of a spring or the like (not illustrated).

The cam 202A is rotated with respect to a shaft, and there is a plurality of values of distance from the shaft to an outer edge. That is, the outer edge of the cam 202A is not a circle with a constant diameter that is the distance from the shaft. Therefore, a distance from the surface of the pushing-up plate 200A to the outer edge of the cam 202A is changed according to the rotation of the cam 202A.

Referring to FIG. 3, when a position where the distance from the shaft to the outer edge of the cam 202A is maximized comes to a direction facing the pushing-up plate 200A, the outer edge of the cam 202A abuts on the projecting part 201A of the pushing-up plate 200A. Accordingly, the pushing-up plate 200A pushed up by the elastic force is pushed downward. Preferably, the pushing-up plate 200A is pushed down until its surface forms a straight line or an approximately straight line with the upper surface of the tray 101, as illustrated in FIG. 3. This state is a state where the sheets can be set to the tray 101, and the direction of the cam 202A and the position of the pushing-up plate 200A of this time are also referred to as "home position".

When the sheets are set to the tray 101 when the pushing-up plate 200A is in the home position, the sheets are also placed on the pushing-up plate 200A, and an end part of a head of the sheet in the conveying direction reaches a lower side of the sheet feeding roller 203A that is a vicinity of a tip of the pushing-up plate 200A.

Referring to FIG. 4, when a position where the distance from the shaft to the outer edge of the cam 202A is minimized comes to the direction facing the pushing-up plate 200A, the outer edge of the cam 202A is separated from the projecting part 201A of the pushing-up plate 200A. Accordingly, the pushing-up plate 200A is pushed upward by the elastic force. At this time, when the sheets are placed on the tray 101 and the pushing-up plate 200A, the upper surface of the sheets comes in contact with the sheet feeding roller 203A, and the sheets are introduced to the conveyance path A one by one from the upper side by friction force of the surface of the sheet feeding roller 203A. The state in which the pushing-up plate 200A is pushed upward is a state where the sheets can be introduced, and the direction of the cam 202A and the position of the pushing-up plate 200A of this time are also referred to as "sheet feeding position".

As described above, the distance from the surface of the pushing-up plate 200A to the outer edge of the cam 202A is changed according to the rotation of the cam 202A with respect to the shaft. That is, the pushing-up plate 200A is driven up and down according to the rotation of the cam 202A with respect to the shaft, and is moved between the home position and the sheet feeding position. Therefore, the cam 202A and its rotation mechanism are included in the drive device of the pushing-up plate 200A.

Referring to FIGS. 5 and 6, a clutch 204A for transmitting rotational force from a power source (not illustrated) such as a motor to the cam 202A is connected to the same shaft as the cam 202A at the second surface side. Projections (projection parts) are provided on a clutch collar 204B (FIG. 7) of the clutch 204A rotated according to the rotational force from the power source.

An actuator 205A having a claw 206 is arranged in the vicinity of the clutch 204A. The actuator 205A controls the position of the claw 206 with respect to the clutch 204A according to a control signal from the control unit 10. That is, the actuator 205A controls the position of the claw 206 with respect to the clutch 204A such that a distance L1 of the claw 206 to the clutch 204A becomes a distance with which the claw 206 can abut on the projection of the clutch collar, or the distance L1 becomes a distance with which the claw 206 can be separated from the projection of the clutch collar 204B.

The clutch 204A transmits the rotational force from the power source such as a motor (not illustrated) to the cam 202A. Rotation of the clutch collar 204B is stopped as the claw 206 abuts on the projection of the clutch collar 204B, and the clutch 204A cuts off the transmission of the rotational force to the cam 202A. Accordingly, the cam 202A stops the rotation. The claw 206 is separated from the projection of the clutch collar 204B, so that the clutch collar 204B is rotated according to the rotational force from the power source, and the clutch 204A transmits the rotational force to the cam 202A. Accordingly, the cam 202A is rotated.

Figure 7:
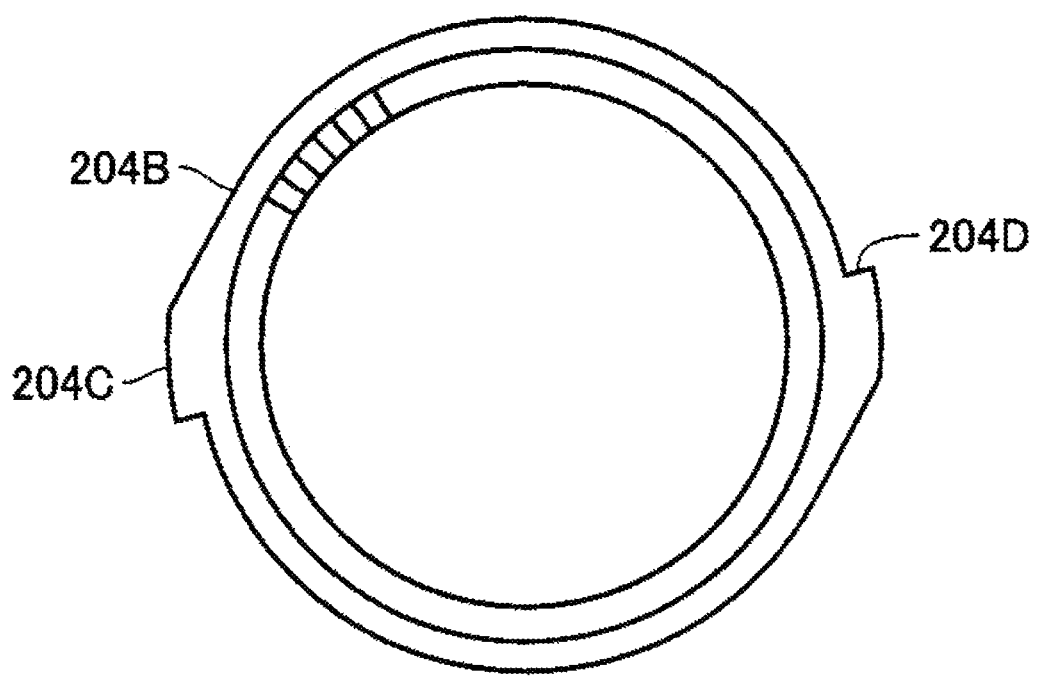
FIG. 7 is a schematic diagram illustrating a cross section in a rotating surface of a clutch collar in the drive device mounted in the conventional MFP.

FIG. 7 is a schematic diagram illustrating a cross section of the clutch collar 204B of the clutch 204A of the conventional MFP. Referring to FIG. 7, two projection parts 204C and 204D are provided on a periphery of the clutch collar 204B. The projection part 204C and the projection part 204D are provided at positions with central angles being separated by 180 degrees of the periphery of the clutch collar 204B, that is, on the diameter.

Figure 8:
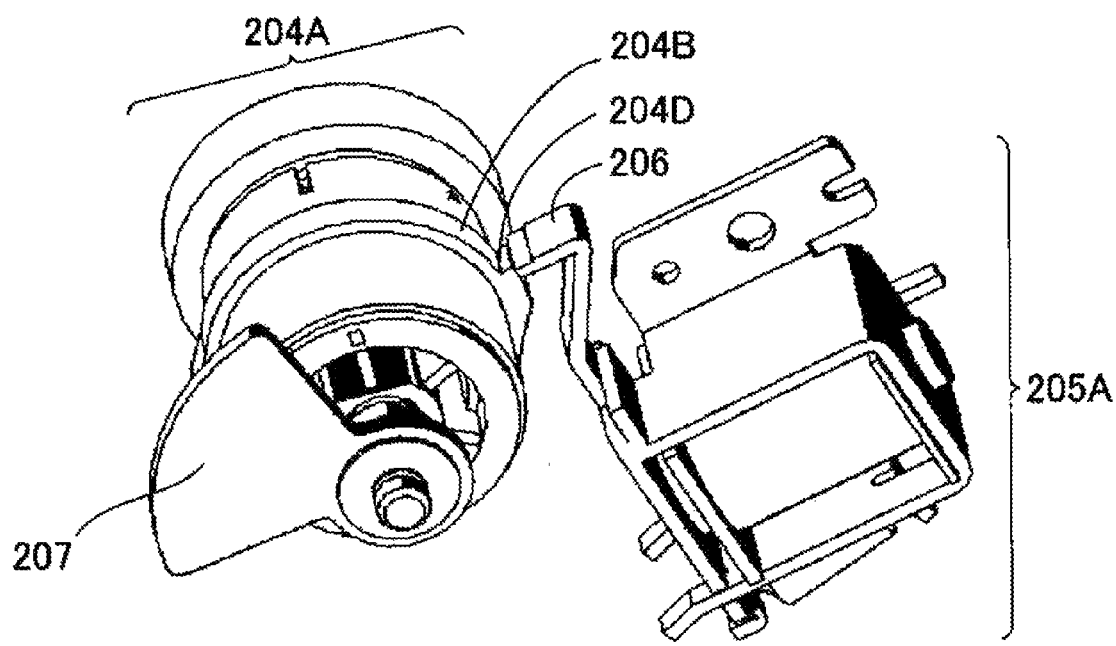
FIG. 8 is a diagram for describing a clutch and an actuator included in the drive device.
Figure 9:
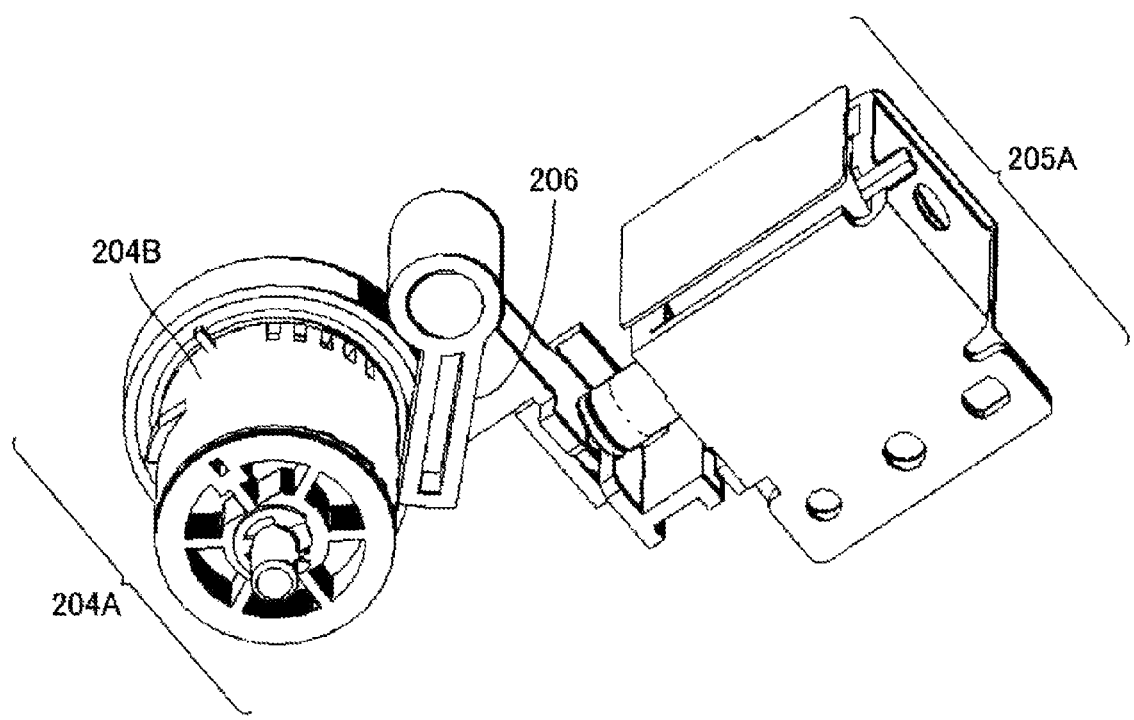
FIG. 9 is a diagram illustrating another example of the clutch and the actuator.

FIG. 8 is a diagram for describing the clutch 204A and the actuator 205A included in the drive device. Referring to FIG. 8, an example of the actuator 205A includes one using a solenoid called flapper solenoid. That is, an example of the actuator 205A includes a configuration to pulls the claw 206 to the main body side by being supplied electricity, and to separate the claw 206 from the main body side according to return force by a coil (not illustrated) by being cut off the electricity. Of course, the actuator 205A is not limited to the one using a solenoid called flapper solenoid. As another example, a structure in which the claw 206 is attached to a plunger, which is moved up and down, using a solenoid called plunger solenoid, as illustrated in FIG. 9, may be employed.

Figure 10A:
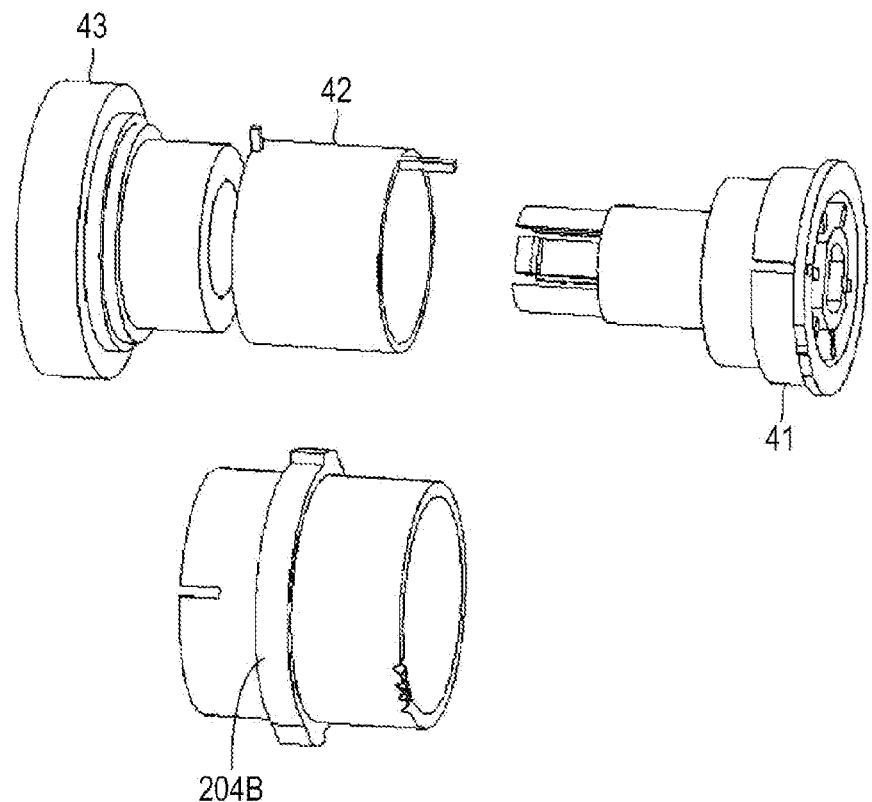
FIGS. 10A and 10B are diagrams for describing a specific example of a structure of a clutch.
Figure 10B:
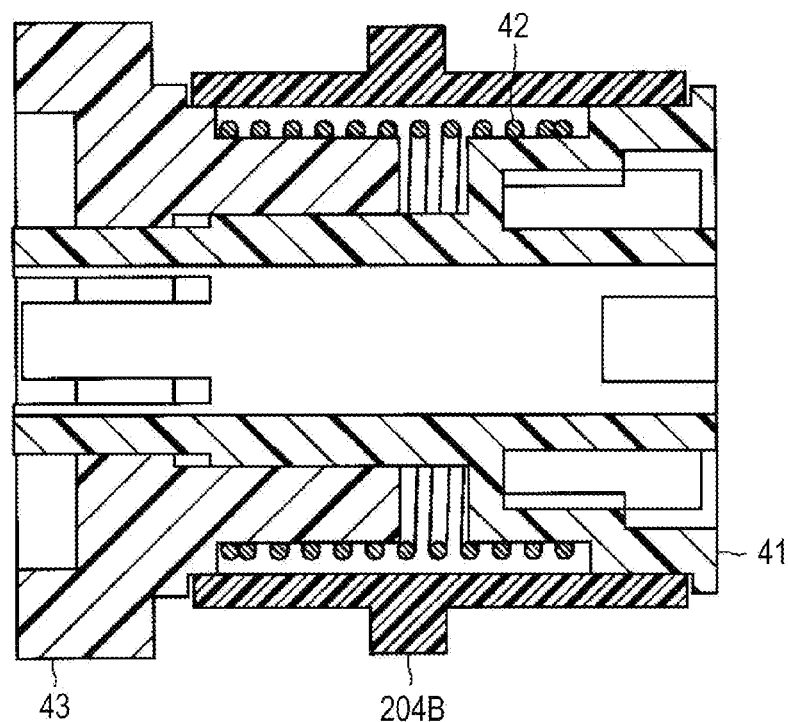

FIGS. 10A and 10B are diagrams for describing a specific example of the structure of the clutch 204A. FIG. 10A is a diagram illustrating an outline of members that configure the clutch 204A, and FIG. 10B is a schematic diagram illustrating a state in which the clutch 204A is cut in an axial direction, and is viewed from a cross section to an outside.

Referring to FIGS. 10A and 10B, a boss 41 having an inner space, of the clutch 204A, is arranged at the same shaft as the cam 202A, and a toothed wheel 43 connected to the power source is fit into a neck under the boss 41. The boss 41 is rotatably arranged in synchronization with the shaft, and transmits the rotational force to the shaft. A spring 42 is arranged across outer sides of the boss 41 and of the toothed wheel 43. A clutch collar 204B is further arranged across the outer sides of the boss 41 and of the toothed wheel 43. An end part of the spring 42 at the boss 41 side is fixed to the boss 41, and the other end part is fixed to the clutch collar 204B.

In a state where the clutch collar 204B is fixed with the claw 206 of the actuator 205A, inward fastening force by the spring 42 is small, and thus the toothed wheel 43 runs idle with respect to an inner side of the spring 42. As a result, the rotational force from the power source is not transmitted to the boss 41 through the spring 42. Therefore, the shaft fixed to the boss 41 is not rotated. Accordingly, the transmission of the rotational force from the power source to the cam 202A is cut off.

In a state where the clutch collar 204B is not fixed with the claw 206 of the actuator 205A, the inward fastening force by the spring 42 works, and the spring 42 is fit with the boss 41 and the toothed wheel 43. As a result, the rotational force from the power source is transmitted to the boss 41 through the spring 42, so that the boss 41 is rotated, and the shaft fixed to the boss 41 is rotated. Therefore, the rotational force from the power source is transmitted to the cam 202A through the shaft.

(Description of Problem Related to Drive Device of Conventional MFP)

In starting a sheet feeding operation, which is an operation to introduce the sheets set to (placed on) the tray 101 to the conveyance path A, it is necessary to set the pushing-up plate 200A to the home position as an initial state. This is because it is necessary to cause the sheets to come in contact with the sheet feeding roller 203A where the pushing-up plate 200A is in the sheet feeding position, once after the sheets are placed on the pushing-up plate 200A where the pushing-up plate 200A is in the home position. Therefore, when the pushing-up plate 200A is not in the sheet feeding position in starting the sheet feeding operation, an operation to rotate the cam 202A by a necessary amount is necessary so that the pushing-up plate 200A becomes in the initial state. This operation may also be referred to as initial operation. Therefore, at the time of starting the sheet feeding operation, it is necessary to detect whether the position of the pushing-up plate 200A is in the home position or the sheet feeding position.

The position of the pushing-up plate 200A is related to the direction of the cam 202A. Therefore, a detection mechanism for detecting the direction of the cam 202A is provided in the conventional MFP. Referring to FIGS. 5 and 6, the clutch 204A mounted in the conventional MFP includes a cut-off plate 207 as the detecting mechanism. A sensor 208 as the detecting mechanism that can detect existence or non-existence of the cut-off plate 207 is installed on a rotation circumference of the cut-off plate 207. The sensor 208 may be an optical sensor made of a light-emitting element and a light-receiving element, for example. The sensor 208 outputs a detection signal to the control unit 10. Accordingly, the control unit 10 can detect that the cut-off plate 207 is at the position of the sensor 208, and can detect the direction of the cam 202A, that is, the position of the pushing-up plate 200A, accordingly.

The clutch collar 204B is attached to the shaft in positional relationship with respect to the cam 202A such that the pushing-up plate 200A comes to the home position when one of the projection part 204C and the projection part 204D (for example, the projection part 204C) is in the position facing the claw 206 of the actuator 205A, and the pushing-up plate 200A comes to the sheet feeding position when the other projection part (for example, the projection part 204D) is in the position facing the claw 206 of the actuator 205A. Therefore, when the projection part 204D is in the state of abutting on the claw 206 of the actuator 205A, as illustrated in FIG. 8, the position of the pushing-up plate 200A detected from the position of the cut-off plate 207 is the sheet feeding position.

When the direction detected at the time of starting the sheet feeding operation is in the sheet feeding position, the conventional MFP half-rotates the clutch collar 204B to cause the direction of the cam 202A to come to the home position. At this time, since the projection part 204C and the projection part 204D are provided on the clutch collar 204B, as illustrated in FIG. 7, the actuator 205A causes the distance L1 of the claw 206 with respect to the clutch 204A to be the distance with which the claw 206 can be separated from the projection of the clutch collar, for a time shorter than a time during which the clutch collar 204B is half-rotated, and then to be the distance with which the claw 206 can abut on the projection of the clutch collar. That is, the actuator 205A causes the claw 206 to be separated from the clutch collar 204B for a time shorter than the time of half rotation of the clutch 204A, and then to come close to the clutch collar 204B. This is the initial operation in starting the sheet feeding operation in the conventional MFP.

That is, in the conventional MFP, it is necessary to detect the direction of the cam 202A, as illustrated above, in order to perform the initial operation. Therefore, there is a problem that the detection operation with the detecting mechanism and the control unit as illustrated by the cut-off plate 207 and the sensor 208 is essential. Meanwhile, there are needs for simplification and a decrease in cost of the device, and there are needs to realize the initial operation without using such a detecting mechanism.

<Configuration Outline>

In the MFP 100 according to the present embodiment, a drive device roughly similar to that of the conventional MFP described with reference to FIGS. 3 to 6 is mounted. That is, in the MFP 100, a drive device for moving the pushing-up plate 200 between the home position and the sheet feeding position is mounted in order to introduce the sheets mounted on the tray 101 to the conveyance path A one by one.

Figure 11:
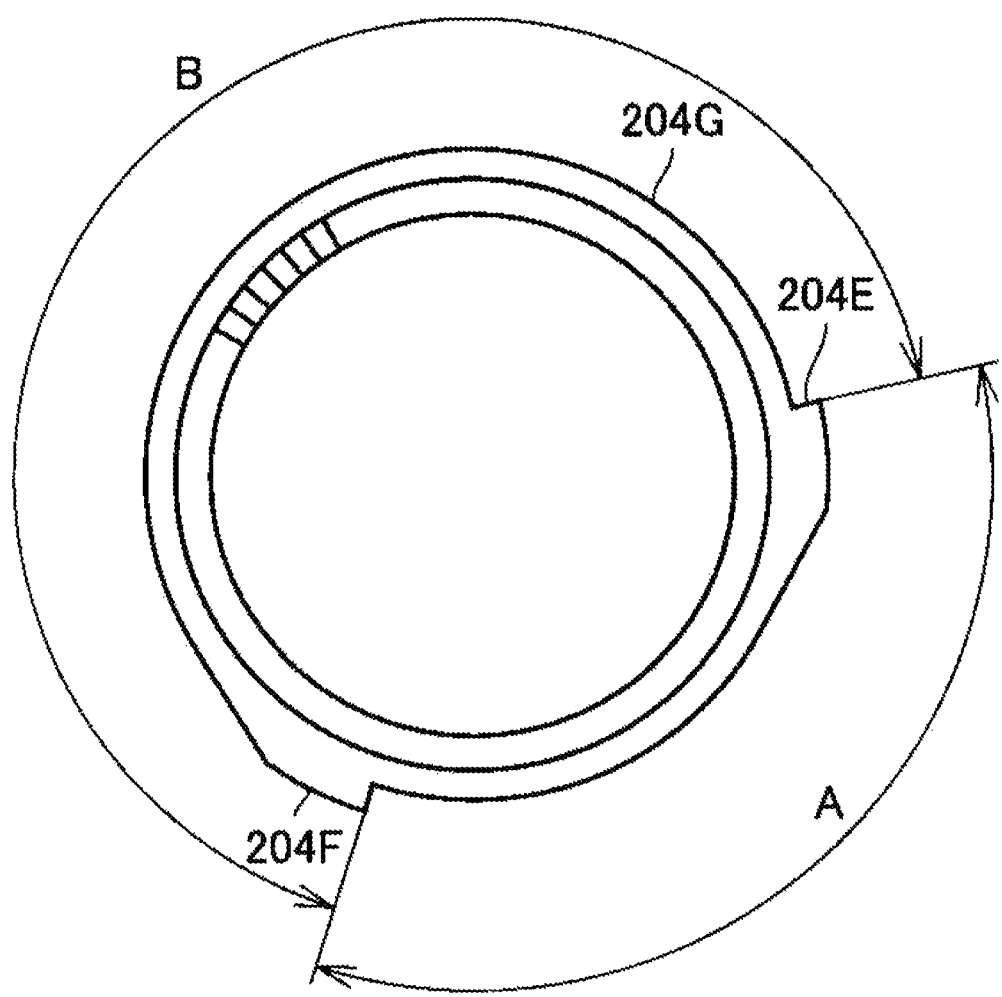
FIG. 11 is a schematic diagram illustrating a cross section in a rotating surface of a clutch collar in a drive device mounted in an MFP according to an embodiment.

However, in the drive device of the MFP 100 according to the present embodiment, as illustrated in FIG. 11, two projections (projection parts 204E and 204F) are provided at asymmetric positions on a periphery of the rotating direction of a clutch collar 204G of the clutch 204 for transmitting the rotational force of the power source to the cam 202. To be specific, referring to FIG. 11, central angles of the projection parts 204E and 204F provided on the clutch collar 204G are two types of an angle A and an angle B, and have relationship of the angle A<the angle B. Preferably, the angle A≈120° and the angle B≈240°.

Figure 12:
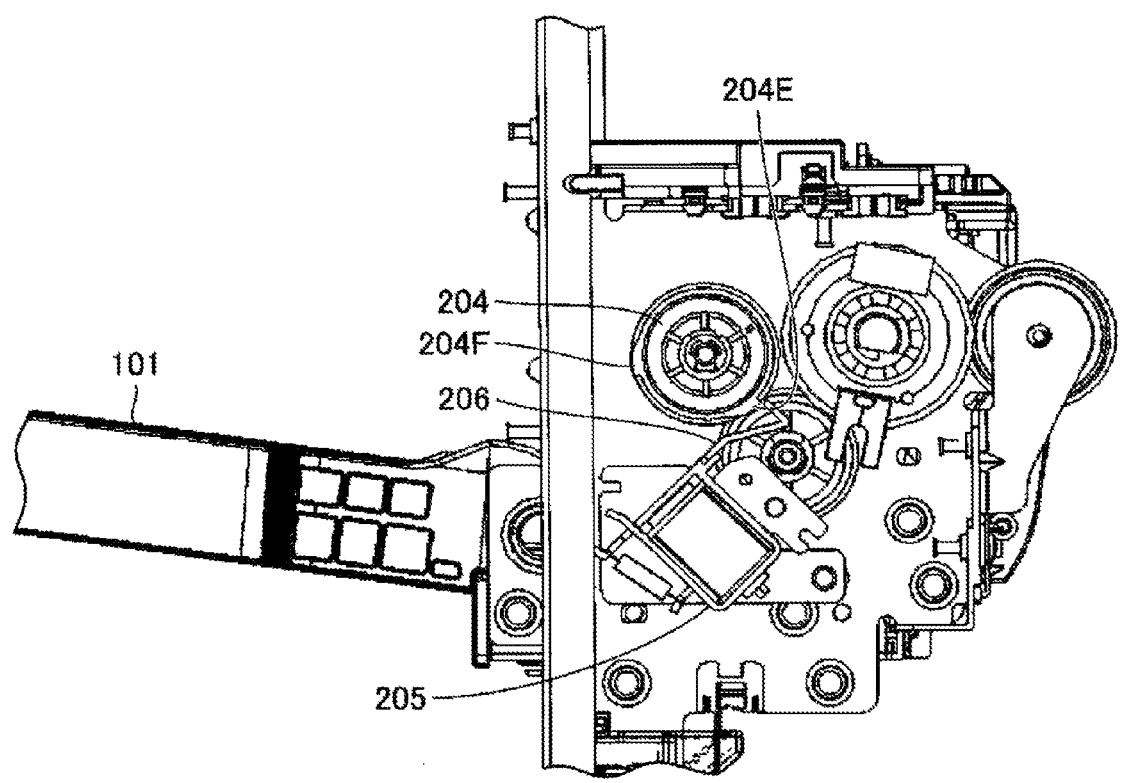
FIG. 12 is a diagram for describing the drive device in the MFP according to the embodiment.
Figure 13:
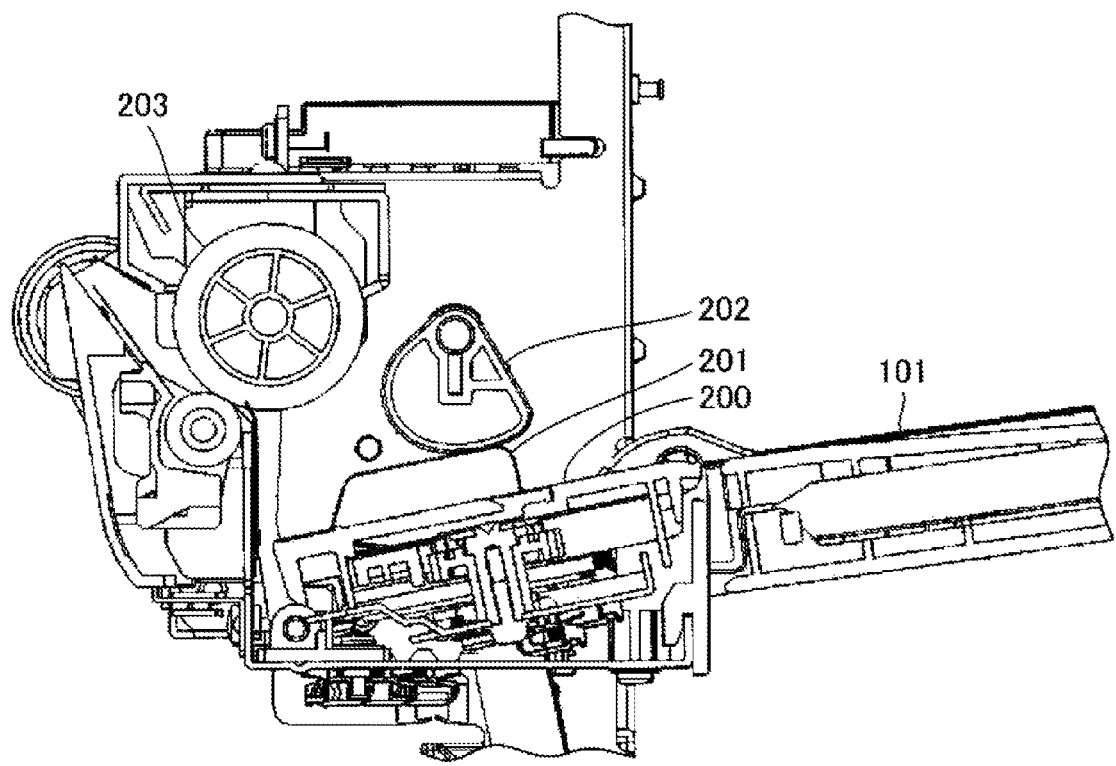
FIG. 13 is a diagram for describing the drive device in the MFP according to the embodiment.
Figure 14:
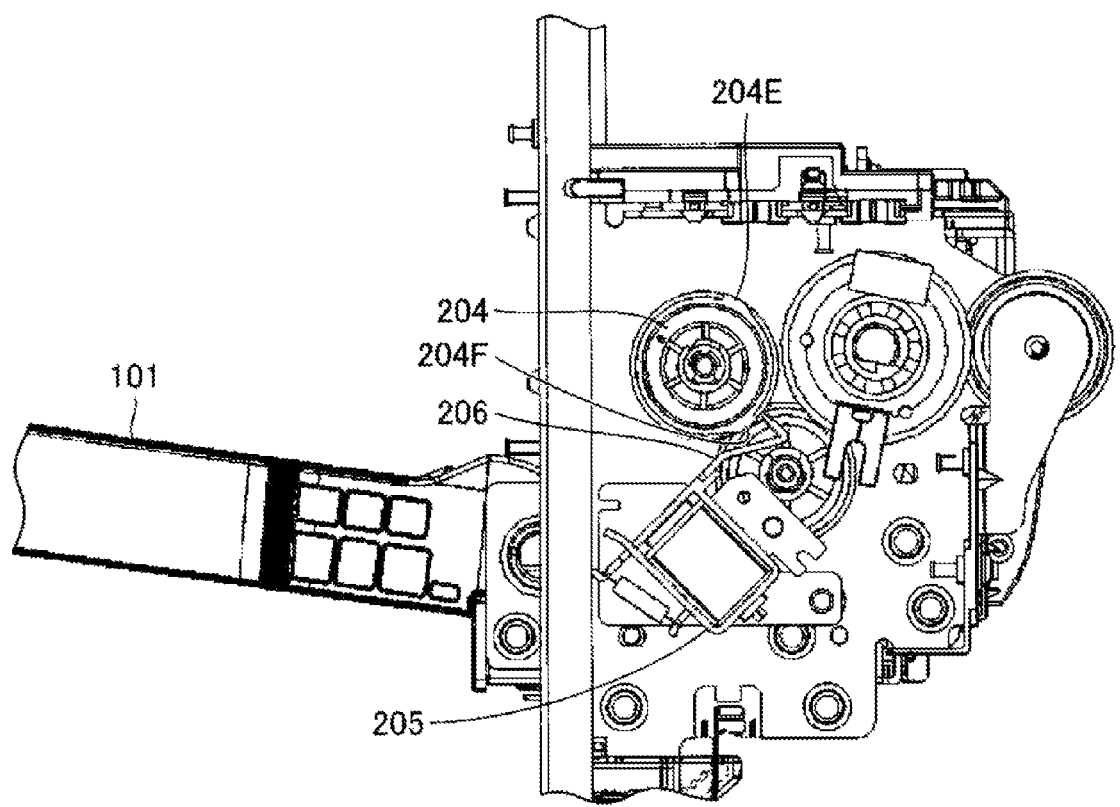
FIG. 14 is a diagram for describing the drive device in the MFP according to the embodiment.
Figure 15:
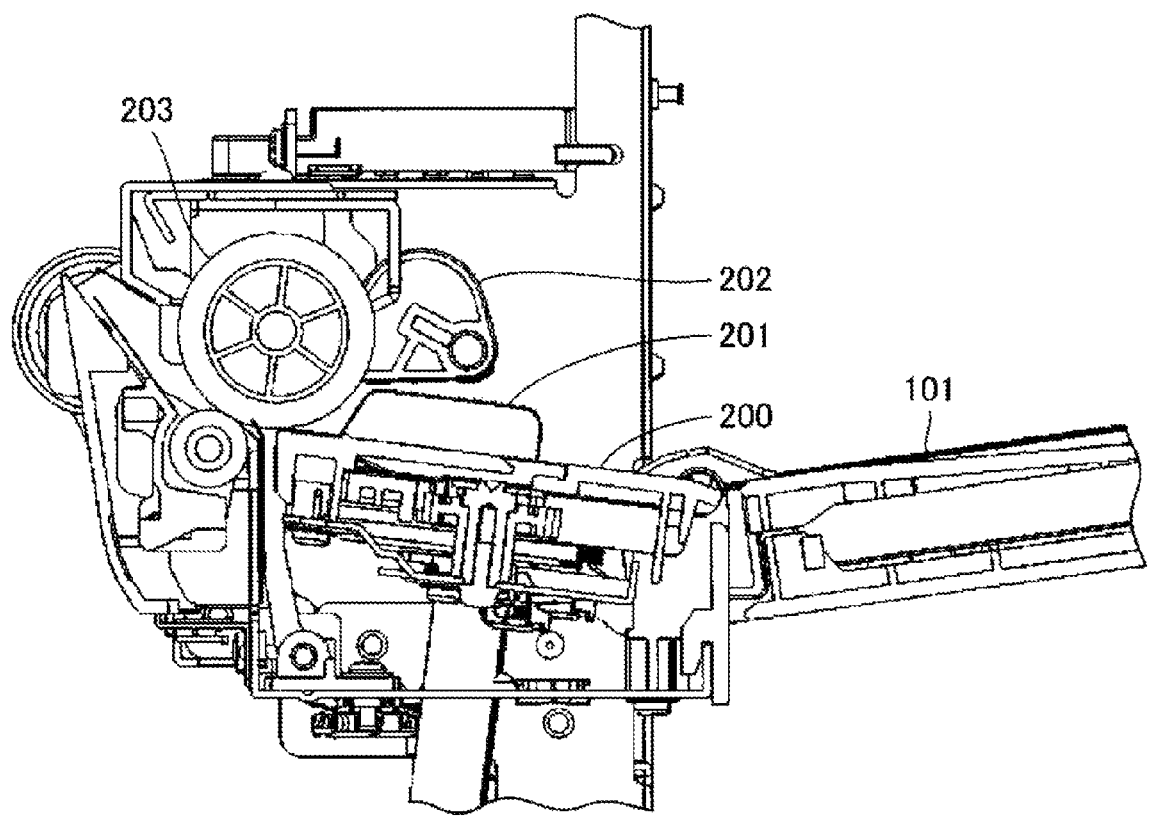
FIG. 15 is a diagram for describing the drive device in the MFP according to the embodiment.

FIGS. 12 to 15 are diagrams for describing the drive device in the MFP 100. FIGS. 12 and 13 illustrate a cross section as viewed from a second surface side of when the cam 202 and the pushing-up plate 200 are in a home position, and a cross section as viewed from a first surface side. FIGS. 14 and 15 illustrate a cross section as viewed from the second surface side of when the cam 202 and the pushing-up plate 200 are in a sheet feeding position, and a cross section as viewed from the first surface side.

As an example, assume that, when a claw 206 of an actuator 205 abuts on the projection part 204E of the clutch collar 204G (FIG. 12), a position where a distance from a shaft to an outer edge of the cam 202 is maximized faces the pushing-up plate 200 (FIG. 13). Therefore, in this state, the pushing-up plate 200 is pushed down by the cam 202, and becomes in the home position. Further, assume that, when the claw 206 of the actuator 205 abuts on the projection part 204F of the clutch collar 204G (FIG. 14), a position where the distance from the shaft to the outer edge of the cam 202 is minimized faces the pushing-up plate 200 (FIG. 15). Therefore, the pushing-up plate 200 is returned to the sheet feeding position.

To cause the position of the pushing-up plate 200 to come to the home position and to the sheet feeding position according to the positions of the projection part 204E and 204F provided on the clutch collar 204G, the outer edge of the cam 202 exhibits the shape as illustrated in FIGS. 13 and 14 such that the length from the shaft to the outer edge within a range according to the angle A is larger than the length from the shaft to the outer edge within a range according to the angle B. Then, the cam 202 is installed in positional relationship with respect to the pushing-up plate 200 such that the outer edge abuts on the pushing-up plate 200 when the range according to the angle A faces the pushing-up plate 200, and the outer edge is separated from the pushing-up plate 200 when the range according to the angle B faces the pushing-up plate 200.

In the MFP 100 according to the present embodiment, the configuration of the clutch 204 is similar to that illustrated in FIGS. 10A and 10B. The clutch 204 transmits rotational force of a power source such as a motor (not illustrated) to the cam 202 when the clutch collar 204G is being rotated. The clutch 204 cuts off the transmission of the rotational force from the power source to the cam 202 when the projection parts 204E and 204F abut on the claw 206 of the actuator 205, and the rotation of the clutch collar 204G is being blocked. The actuator 205 is electrically connected to the control unit 10, and controls a distance L2 of the claw 206 with respect to the clutch 204 according to a control signal from the control unit 10. That is, the actuator 205 causes the claw 206 to abut on or to be separated from the projection parts 204E and 204F of the clutch collar 204G according to the control signal from the control unit 10.

When the actuator 205 uses a solenoid, the control unit 10 controls application of electricity to the actuator 205, thereby to control the position of the claw 206 with respect to the clutch 204. That is, the control unit 10 causes the solenoid to be in an excited state by applying electricity to the actuator 205. Accordingly, the claw 206 is pulled to a main body side of the actuator 205, and the distance L2 from the claw 206 to a surface of the clutch collar of the clutch 204 becomes large. Further, the control unit 10 causes the solenoid to be in a non-excited state by cutting off the application of electricity to the actuator 205. Accordingly, the claw 206 is separated from the main body side of the actuator 205 according to return force by a coil (not illustrated), and the distance L2 becomes small.

Figure 19A:
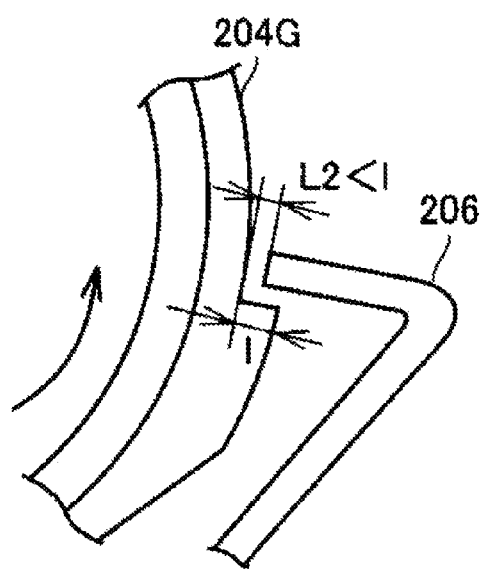
FIGS. 19A and 19B are diagrams for describing relationship between a claw and a projection part of a clutch.
Figure 19B:
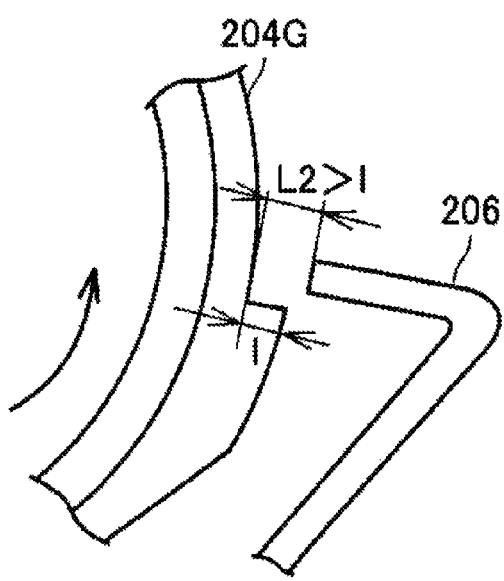

FIGS. 19A and 19B are diagrams for describing relationship between the claw 206 and the projection part of the clutch 204. FIG. 19A illustrates a state in which the claw 206 is separated from the main body side of the actuator 205 according to the return force by a coil (not illustrated), and the distance L2 becomes small. As illustrated in FIG. 19A, when the distance L2 from the claw 206 to the surface of the collar clutch collar 204G becomes smaller than a height 1 of the projection part provided on the clutch collar 204G, the claw 206 abuts on the projection part by rotation of the clutch 204 in the arrow direction of FIG. 19A. Accordingly, the rotation of the clutch 204 is stopped. Therefore, it can be said that the position of the claw 206, where the distance L2 from the claw 206 to the surface of the clutch collar 204G is smaller than the height 1 of the projection part, is the position where the claw 206 can abut on the projection of the clutch collar 204G, and the distance L2 of that time is the distance with which the claw 206 can abut on the projection on the clutch collar 204G.

FIG. 19B illustrates a state in which the claw 206 is pulled to the main body side of the actuator 205, and the distance L2 becomes large. When the distance L2 from the claw 206 to the clutch 204 becomes larger than the height 1 of the projection part of the clutch 204, as illustrated in FIG. 19B, the clutch 204 is rotated by rotation of the clutch 204 in the arrow direction of FIG. 19B without the projection part abutting on the claw 206. Accordingly, the rotation of the clutch 204 is continued. Therefore, it can be said that the position of the claw 206 where the distance L2 from the claw 206 to the clutch 204 becomes larger than the height 1 of the projection part of the clutch 204 is the position where the claw 206 can be separated from the projection of the clutch collar 204G, and the distance L2 of that time is the distance with which the claw 206 can be separated from the projection of the clutch collar 204G.

(Initial Operation)

At the time of starting a sheet feeding operation, the pushing-up plate 200 needs to be at the home position as an initial position. The MFP 100 according to the present embodiment causes the distance L2 of the claw 206 of the actuator 205 with respect to the clutch 204 to be the distance with which the claw 206 can be separated from the projection of the clutch collar 204G, during a time T that is longer than the time during which the clutch collar 204G is rotated by an angle A, and is shorter than a time during which the clutch collar 204G is rotated by an angle B. Following that the MFP 100 causes the distance L2 to be the distance with which the claw 206 can abut on the projection of the clutch collar. That is, the MFP 100 separates the claw 206 from the clutch collar 204G during the time T that is a time longer than the time during which the clutch 204 is rotated by the angle A, and shorter than the time during which the clutch 204 is rotated by the angle B, and then causes the claw 206 to come close to the clutch collar 204G.

As an example, the clutch 204 is rotated in a left handed direction in FIG. 11. When the claw 206 of the actuator 205 abuts on the projection part 204E at the time of starting the initial operation, the initial operation in which the claw 206 is separated from the clutch collar 204G during the time T and then comes close to the clutch collar 204G is performed, so that the projection part 204E is separated from the claw 206 and starts rotation, and the projection part 204F passes through the position of the separated claw 206. Then, the projection part 204E coming close to the claw 206 next abuts on the claw 206.

Meanwhile, when the claw 206 of the actuator 205 abuts on the projection part 204F at the time of starting the initial operation, the initial operation in which the claw 206 is separated from the clutch collar 204G during the time T and then comes close to the clutch collar 204G is performed, so that the projection part 204F is separated from the claw 206 and starts rotation, and the projection part 204E coming close to the claw 206 next abuts on the claw 206.

That is, in the MFP 100 in the present embodiment, the projection part 204E and the projection part 204F are installed at asymmetric positions of the clutch collar 204G. Therefore, even in a state where the claw 206 of the actuator 205 abuts on either projection part at the time of starting the initial operation, the initial operation in which the claw 206 is separated from the clutch collar 204G during the time T from the state and then comes close to the clutch collar 204G is performed, whereby the projection part 204E corresponding to the home position abuts on the claw 206, and the rotation of the clutch collar 204G is stopped. Therefore, the clutch collar 204G of the MFP 100 in the present embodiment is configured like FIG. 11, whereby the MFP 100 does not need to detect the position of the pushing-up plate 200 at the initial operation. Therefore, the detecting mechanism such as the cut-off plate 207 and the sensor 208, which is necessary to detect the position of the pushing-up plate 200A in the conventional MFP is not necessary in the MFP 100.

Note that the MFP 100 does not need the detecting mechanism because the clutch 204 has the above-described configuration. Therefore, at the time of starting the sheet feeding operation, the initial operation is executed once, regardless of the position of the pushing-up plate 200. Therefore, preferably, the MFP 100 executes the initial operation at timing before a print job is issued and printing is started, which is determined in advance, and causes the pushing-up plate 200 to come to the home position. Accordingly, the sheet feeding operation can be promptly started when the job is issued, and a time to start the printing can be shortened. Note that the timing determined in advance corresponds to timing when a power source of the MFP 100 is turned ON, timing when work for fixing a paper jam is detected based on a sensor signal from a sensor for detecting opening/closing of a door, and at the time of starting a warm-up operation executed at the time of ON of the power source or restoration from a power saving mode.

(Sheet Feeding Operation)

After the initial operation, the MFP 100 executes the sheet feeding operation for introducing the sheets on the tray 101 to the conveyance path A one by one. As described above, the sheets on the tray 101 are pushed up by the pushing-up plate 200 and come in contact with the sheet feeding roller 203, so that the sheets are introduced to the conveyance path A by friction force. When the printing is started and necessity of the sheet feeding is caused, the MFP 100 executes an operation for causing the pushing-up plate 200 to be in the sheet feeding position, as the sheet feeding operation. Further, when the printing is completed, the MFP 100 executes an operation for causing the pushing-up plate 200 to be in the home position so that the sheets can be placed on the tray 101, as the sheet feeding operation.

<Apparatus Configuration>

Figure 16:
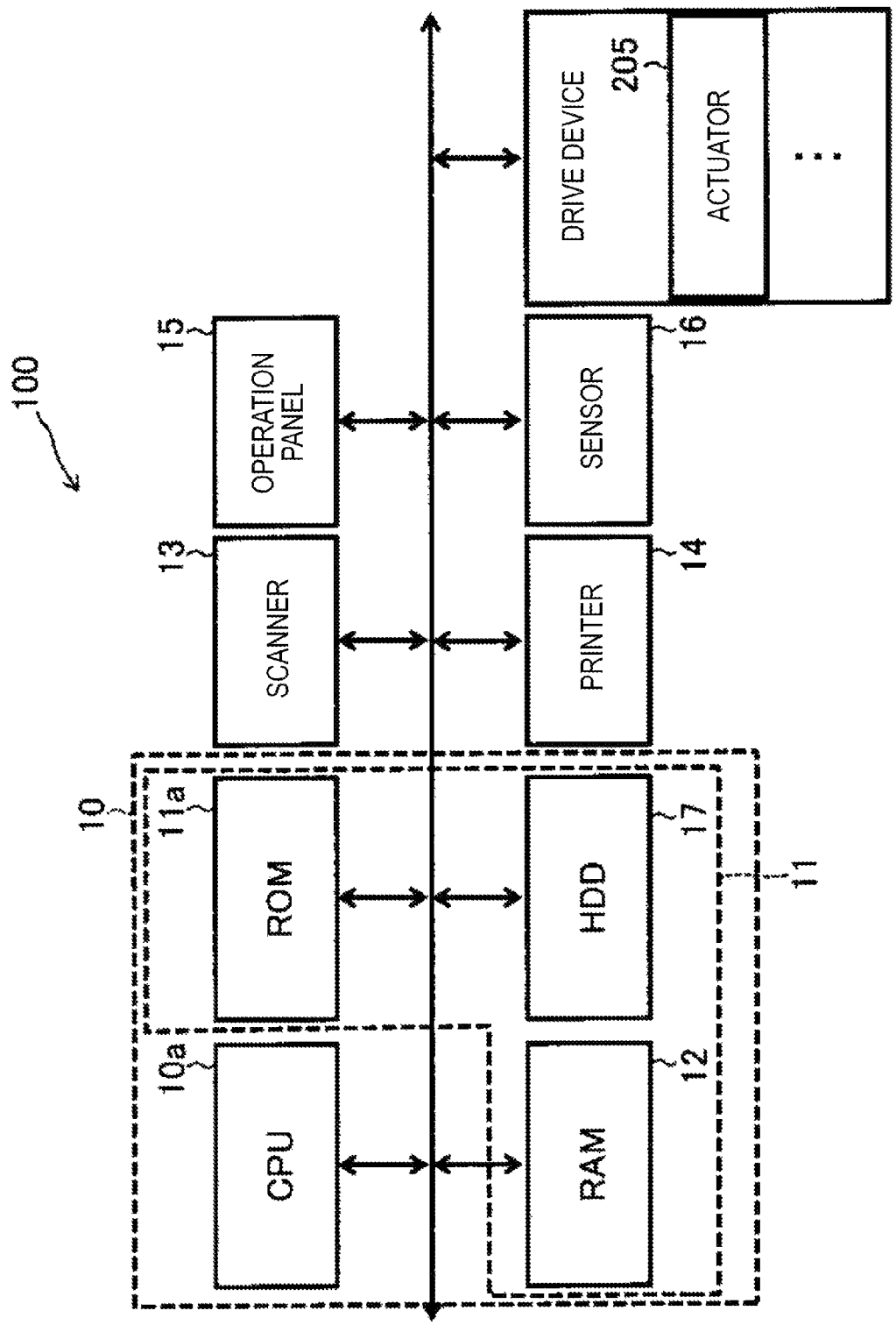
FIG. 16 is a block diagram illustrating a specific example of an apparatus configuration of the MFP.

FIG. 16 is a block diagram illustrating a specific example of an apparatus configuration of the MFP 100. Referring to FIG. 16, the MFP 100 includes the control unit 10, the scanner 13, the printer 14, the operation panel 15, the sensor such as the sensor 16 (FIG. 2A) included in the tray 101, and the drive device including the actuator 205.

The control unit 10 includes a CPU 10$a$ for controlling the entire apparatus, and the memory 11. The memory 11 further includes a read only memory (ROM) 11$a$ that is a memory for storing a program executed in the CPU 10$a$, a random access memory (RAM) 12 that is a memory serving as a work area when the CPU 10$a$ executes the program, and a hard disk drive (HDD) 17 as an example of a large-capacity storage device for storing image data and the like.

<Functional Configuration>

Figure 17:
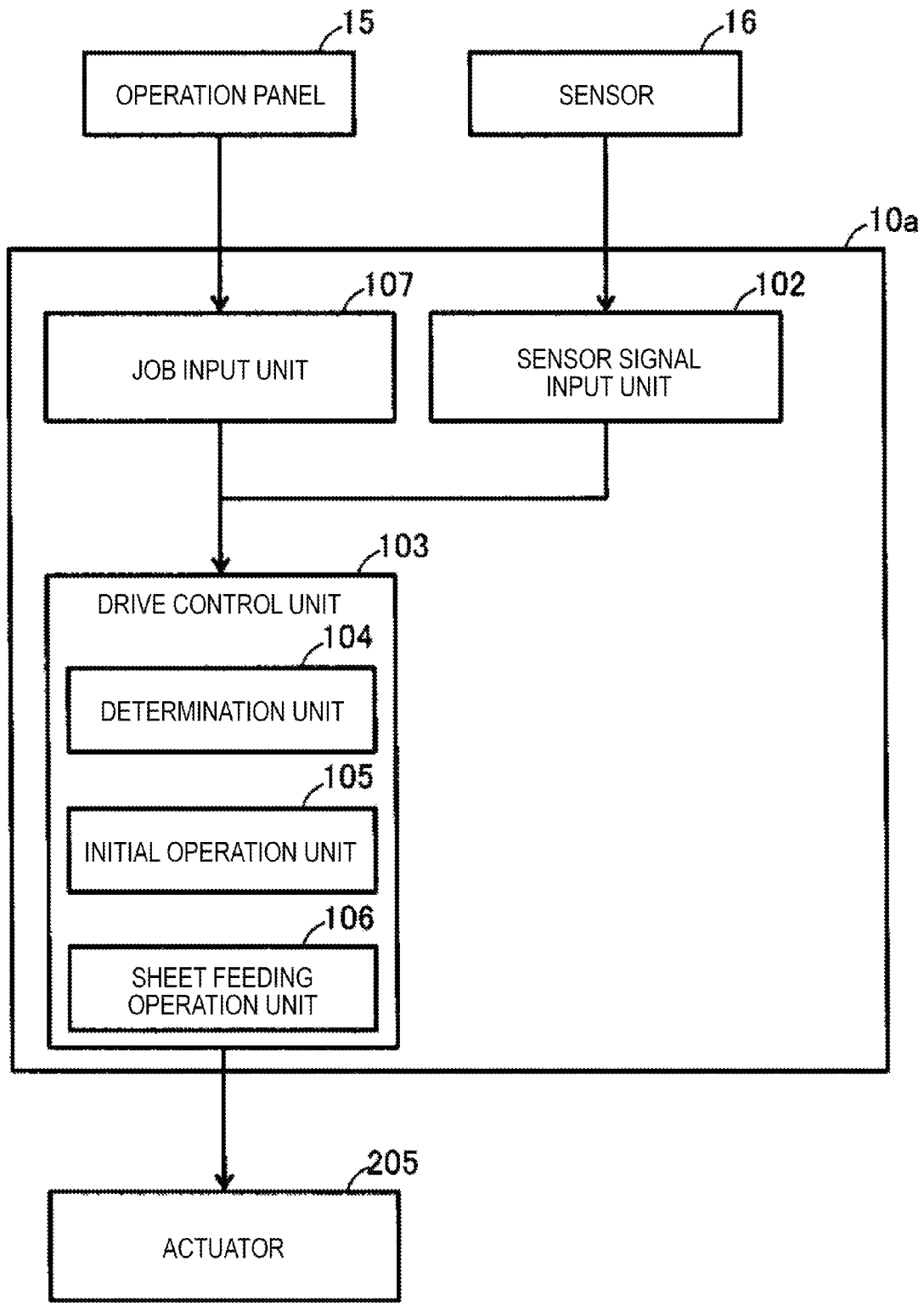
FIG. 17 is a block diagram illustrating a specific example of a functional configuration of the MFP.

FIG. 17 is a block diagram illustrating a specific example of a functional configuration for performing the initial operation and the sheet feeding operation in the MFP 100. The CPU 10$a$ reads the program stored in the ROM 11$a$ to the RAM 12, and executes the program, so that functions of FIG. 17 are realized by the CPU 10$a$. However, at least a part of the functions may be realized by another configuration illustrated in FIG. 16, or by another hardware configuration such as an electrical circuit (not illustrated).

Referring to FIG. 17, the CPU 10$a$ of the MFP 100 includes a job input unit 107 for receiving an input of a job including a print instruction according to an instruction input from the operation panel 15, a sensor signal input unit 102 for receiving an input of a sensor signal from the sensor 16, and a drive control unit 103 for controlling driving of the drive unit by outputting a control signal to the actuator 205 included in the drive device.

The drive control unit 103 includes a determination unit 104 for determining timing when the initial operation is executed, an initial operation unit 105 for executing the initial operation, and a sheet feeding operation unit 106 for executing the sheet feeding operation.

The determination unit 104 detects the timing determined in advance as the timing when the initial operation is executed. The timing determined in advance corresponds to timing when a power source of the MFP 100 is turned ON, timing when work for fixing a paper jam is detected based on a sensor signal from a sensor for detecting opening/closing of a door, and at the time of starting a warm-up operation executed at the time of ON of the power source or restoration from a power saving mode. The determination unit 104 detects these types of timing.

The initial operation unit 105 executes the initial operation in which the distance L2 of the claw 206 with respect to the clutch collar 204G of the clutch is caused to be the second distance with which the claw 206 can be separated from the projection part of the clutch collar 204G, during the time T1 in which the clutch collar 204G is rotated by the angle larger than the angle A and smaller than the angle B, by the rotational force of the power source, and is then caused to be the first distance with which the claw 206 can abut on the projection part of the clutch collar 204G. Accordingly, the projection part 204E of the clutch collar 204G abuts on the claw 206, the clutch collar 204G stops the rotation, and the cam 202 and the pushing-up plate 200 come to the home position.

The sheet feeding operation unit 106 executes the operation in which the distance L2 is caused to be the second distance, during the time T2 in which the clutch collar 204G is rotated by the angle smaller than the angle A, by the rotational force of the power source, and is then caused to be the first distance, as the sheet feeding operation at the timing when the conveyance of the sheets is started. Accordingly, the projection part 204F of the clutch collar 204G abuts on the claw 206, the clutch collar 204G stops the rotation, and the cam 202 and the pushing-up plate 200 come to the sheet feeding position. That is, the sheets placed on the tray 101 come in contact with the sheet feeding roller 203, and are introduced to the conveyance path A.

The sheet feeding operation unit 106 executes the operation in which the distance L2 is caused to be the second distance with which the claw 206 can be separated from the projection part of the clutch collar 204G, during the time T1 in which the clutch collar 204G is rotated by the angle larger than the angle A and smaller than the angle B, by the rotational force of the power source, and is then caused to the first distance with which the claw 206 can abut on the projection part of the clutch collar 204G, as the sheet feeding operation at the timing when the conveyance of the sheets is terminated. Accordingly, the projection part 204E of the clutch collar 204G abuts on the claw 206, the clutch collar 204G stops the rotation, and the cam 202 and the pushing-up plate 200 come to the home position. That is, it becomes the state where the sheets can be placed on the tray 101. Note that the sheet feeding operation at timing when the conveyance of the sheets is terminated is the same as the initial operation.

<Operation Flow>

Figure 18:
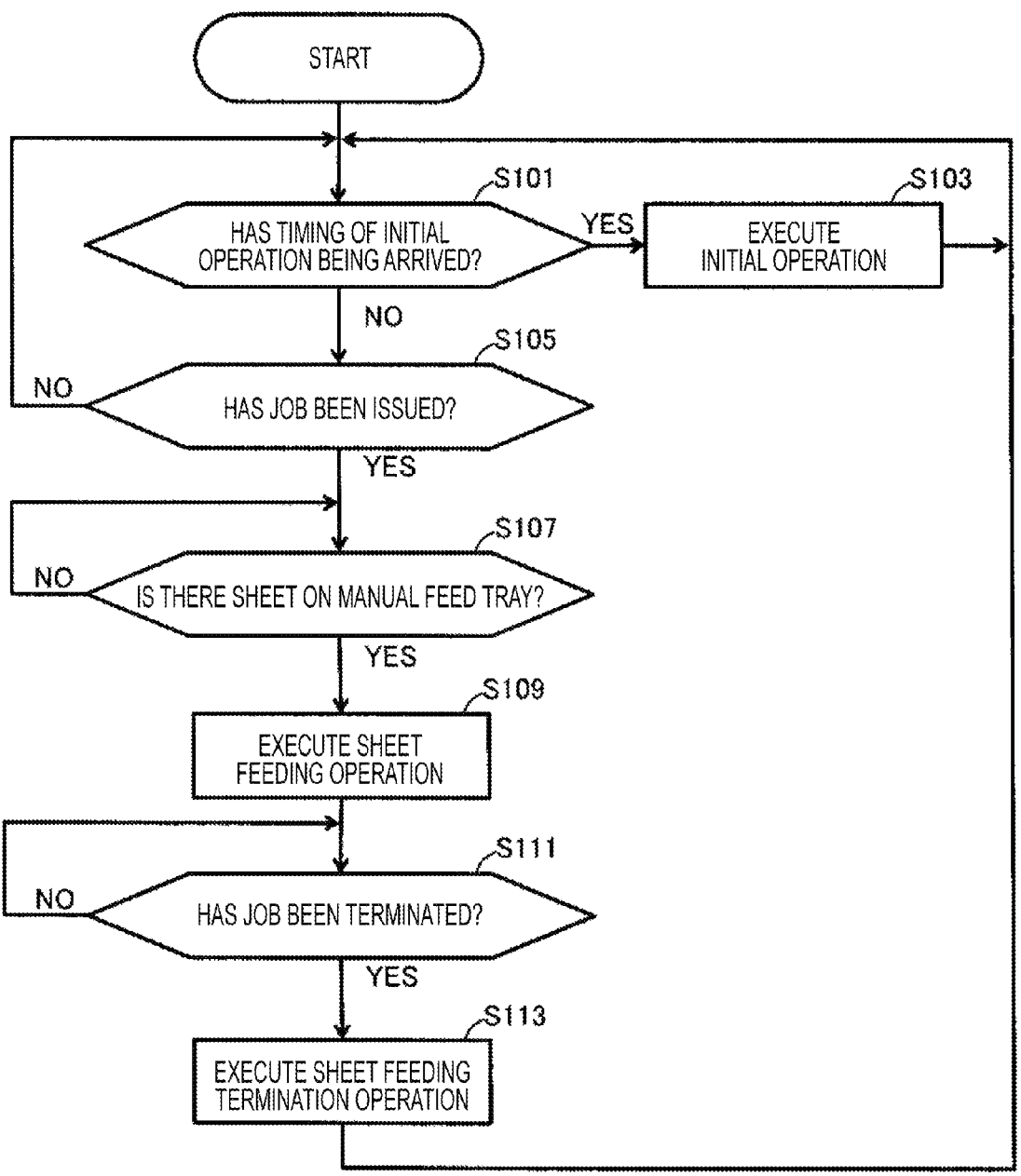
FIG. 18 is a flowchart illustrating a flow of control of the drive device in the MFP.

FIG. 18 is a flowchart illustrating a flow of the control of the drive device in the MFP 100. The operation illustrated in the flowchart of FIG. 18 is realized such that the CPU 10a of the MFP 100 reads the program stored in the ROM 11a to the RAM 12, executes the program, and exerts the functions of FIG. 17.

Referring to FIG. 18, when having detected arrival of the timing when the initial operation is executed such as the time of ON of the power source or the time of completion of the work for fixing a paper jam (YES at step S101), the CPU 10a executes the initial operation (step S103). An example of the initial operation at step S103 includes, in the case of the operation where the actuator 205 uses a solenoid, for example, control to apply electricity to the actuator 205 to cause the actuator 205 to be in the excited state, and then to cut off the application of electricity to the actuator 205 to cause the actuator 205 to be in the non-excited state, during the time T1.

When it is not the timing of the initial operation, and having detected issuance of a job (YES at step S105), the CPU 10a confirms whether the sheets are placed on the tray 101, based on the sensor signal from the sensor 16. Then, when the sheets are not placed (NO at step S107), the placement is waited.

When the sheets are placed on the tray 101 (YES at step S107), the CPU 10a executes the sheet feeding operation (step S109). An example of the sheet feeding operation at step S109 includes, in the case where the actuator 205 uses a solenoid, as an example, control to apply electricity to the actuator 205 to cause the actuator 205 to be in the excited state, during the time T2, and then to cut off the application of electricity to the actuator 205 to cause the actuator 205 to be in the non-excited state.

When processing of the job, that is, the print operation is completed, and the sheet feeding is terminated (YES at step S111), the CPU 10a executes the sheet feeding operation of at the time of terminating the sheet feeding (step S111). An example of the sheet feeding operation at step S103 includes, in the case where the actuator 205 uses a solenoid, for example, control to apply electricity to the actuator 205 to cause the actuator 205 to be in the excited state, during the time T1, then to cut off the application of electricity to the actuator 205 to cause the actuator 205 to be in the non-excited state.

When the series of control is terminated, the CPU 10a returns the control to the first step, and waits for detection of the timing of the initial operation, or detection of issuance of a job.

<Effect of Embodiment>

In the drive device, with the simple configuration in which the two projection parts are provided at asymmetric positions on the periphery of the rotating direction, as illustrated in FIG. 11, of the clutch for connecting/disconnecting the rotational force from the power source to the driven member, the amount of rotation of the clutch collar is controlled, whereby the projection part abutting on the claw of the actuator, of the two projection parts, can be easily controlled. Accordingly, the need of the mechanism for detecting the position of the rotating direction of the driven member can be eliminated without adding a new configuration.

In the MFP 100 according to the present embodiment, such a drive device is mounted, whereby the apparatus configuration can be simplified compared with an MFP with a conventional drive device, and the MFP 100 can respond to the needs of the decrease in cost.

Further, when the driven member is the pushing-up plate 200 of the MFP 100, the initial operation is performed at the timing before the sheet feeding operation is started, which is determined in advance, as described above, whereby the time from the start of the job processing to the start of the sheet feeding can be shortened, and a job processing time as a whole can be shortened.

Note that, in the above example, the driven member of the drive device is the pushing-up plate 200 for feeding the sheets placed on the tray 101, a so-called manual feed tray. However, the driven member is not limited to the pushing-up plate 200. The driven member of the drive device may be, for example, a member for moving the sheets housed in the sheet feeding cassette 20 to the positions of the sheet feeding roller 21 and the separating roller 22. Further, the driven member is not limited to the member for conveying the sheets. Further, the apparatus in which the drive device is mounted is not limited to the image forming apparatus such as the MFP, and every apparatus can be supposed.

According to an embodiment of the present invention, in a drive device, and an image forming apparatus in which the drive device is mounted, the position of a driven member can be set to a position of at the time of starting driving with a simpler structure.

Although the present invention has been described and illustrated in detail, it is clearly understood that the same is by way of illustrated and example only and is not to be taken by way of limitation, the scope of the present invention being interpreted by terms of the appended claims. It is intended that all changes are included within claims and the meaning and the scope of equivalents.

What is claimed is:

1. A drive device comprising:
   a cam;
   a clutch installed on a same shaft with the cam, and for connecting/disconnecting rotational force from a power source to the cam through the shaft according to rotation of a clutch collar;
   an actuator including a claw part; and a control mechanism for controlling a position of the claw part of the actuator, wherein the control mechanism controls the position of the claw part such that a distance L becomes a first distance with which the claw part is able to abut on a projection part provided on the clutch collar, or a second distance with which the claw part is able to be separated from the projection part of the clutch collar, where a distance from the claw part to a surface of the clutch collar of the clutch is the distance L, the clutch transmits the rotational force to the cam by rotation of the clutch collar according to the rotational force in a state where the claw part is separated from the projection part, and cuts off the transmission to the cam by stopping of the rotation by the clutch collar in a state where the claw part abuts on the projection part, the projection part includes a first projection part and a second projection part provided at asymmetric positions on a periphery of the clutch collar, the periphery being of a rotating direction of the rotating force, an angle A and an angle B satisfy the angle A<the angle B, where a position where the claw part abuts on the first projection part is an initial position in a drive operation of the cam, a central angle from the first projection part to the second projection part in the rotating direction of the rotational force is the angle A, and a central angle from the second projection part to the first projection part in the rotating direction of the rotational force is the angle B, and the control mechanism executes initial control in which the position of the claw part is caused to be a position where the distance L becomes the second distance during a time T1 in which the clutch collar is rotated by an angle larger than the angle A and smaller than the angle B by the rotational force, and the position of the claw part is caused to be a position where the distance L becomes the first distance after passage of the time T1, at a time of starting the drive operation, in order to cause the cam to come to the initial position.

2. An image forming apparatus in which the drive device according to claim 1 is mounted, wherein the cam has a plurality of values of a distance from the shaft to an outer edge, and a sheet feeding mechanism for changing a position of a mounting member for mounting a sheet according to a distance to the outer edge of the cam, and conveying the sheet mounted on the mounting member to an image forming position every time of the change.

3. The image forming apparatus according to claim 2, wherein the mounting member is energized in a direction toward a conveying member for conveying the sheet by elastic force, the cam is arranged at a same side as the conveying member with respect to the mounting member, and at a position where a distance from the mounting member to the shaft becomes a distance smaller than a maximum value of the distance from the shaft to the outer edge, and the outer edge abuts on the mounting member and presses the conveying member in a direction opposite to the direction of the energization by the elastic force, and away from the conveying member, by the rotation of the cam by the rotational force.

4. The image forming apparatus according to claim 3, wherein in a part of the outer edge of the cam, the part being corresponding to a periphery of the clutch collar that reaches to a position where the second projection part abuts on the claw part from a position where the first projection part abuts on the claw part according to the rotational force, the distance from the shaft to the outer edge is longer than a distance from the shaft to the conveying member, and in a part of the outer edge of the cam, the part being corresponding to the periphery of the clutch collar that reaches to a position where the first projection part abuts on the claw part from a position where the second projection part abuts on the claw part according to the rotational force, the distance from the shaft to the outer edge is the distance from the shaft to the conveying member or less.

5. The image forming apparatus according to claim 4, wherein the control mechanism of the drive device executes a drive operation in which the position of the claw part is caused to be a position where the distance L becomes the second distance during a time T2 in which the clutch collar is rotated by an angle smaller than the angle A by the rotational force, and the position of the claw part is caused to be a position where the distance L becomes the first distance after passage of the time T2, at timing when the conveyance of the sheet is started.

6. The image forming apparatus according to claim 5, wherein the control mechanism of the drive device executes a drive operation in which the position of the claw part is caused to be a position where the distance L becomes the second distance during the time T1 in which the clutch collar is rotated by an angle larger than the angle A and smaller than the angle B, and the position of the claw part is caused to be a position where the distance L becomes the first distance after passage of the time T1, at timing when the conveyance of the sheet is terminated.

* * * * *